Aug. 28, 1923.
E. C. MYERS
1,466,098
HARVESTER
Filed July 6, 1920
4 Sheets-Sheet 1
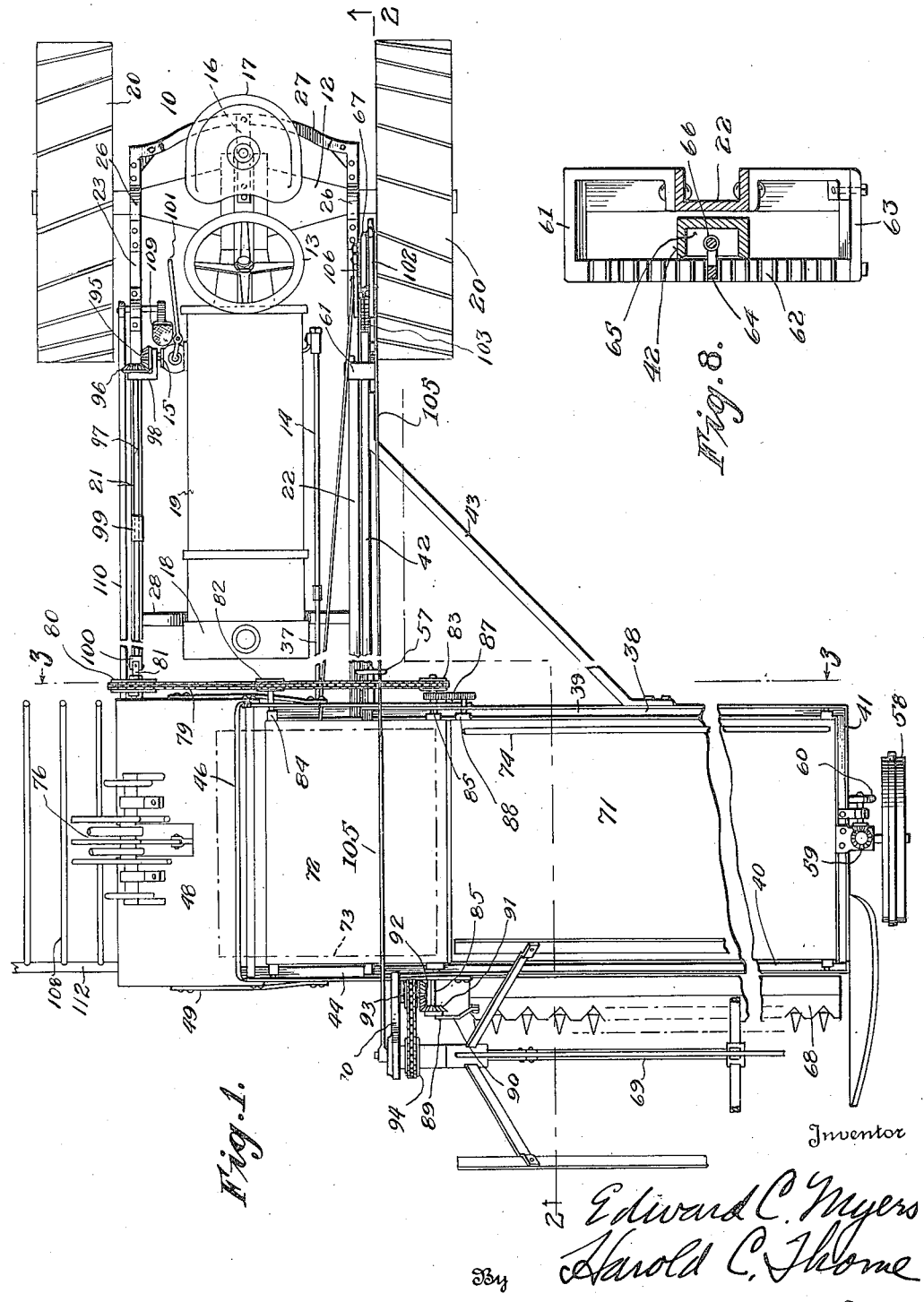

Aug. 28, 1923.
E. C. MYERS
1,466,098
HARVESTER
Filed July 6, 1920
4 Sheets-Sheet 2
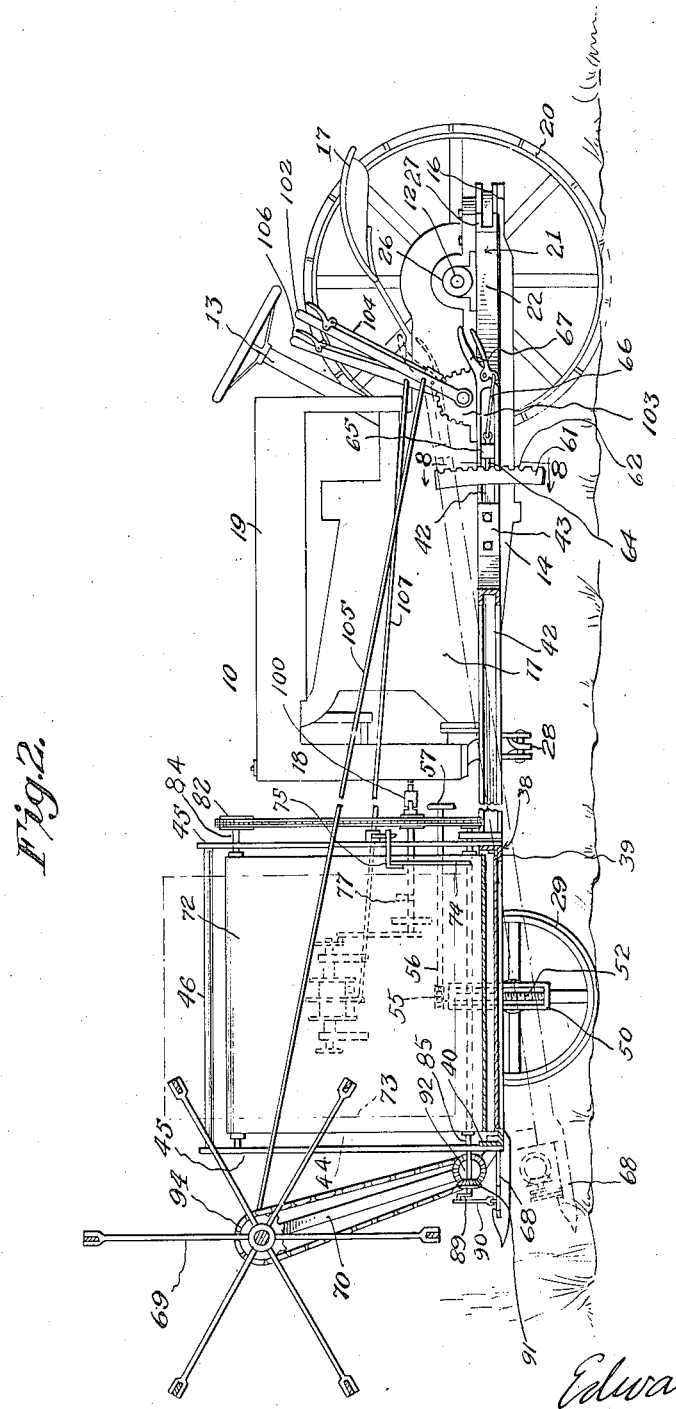

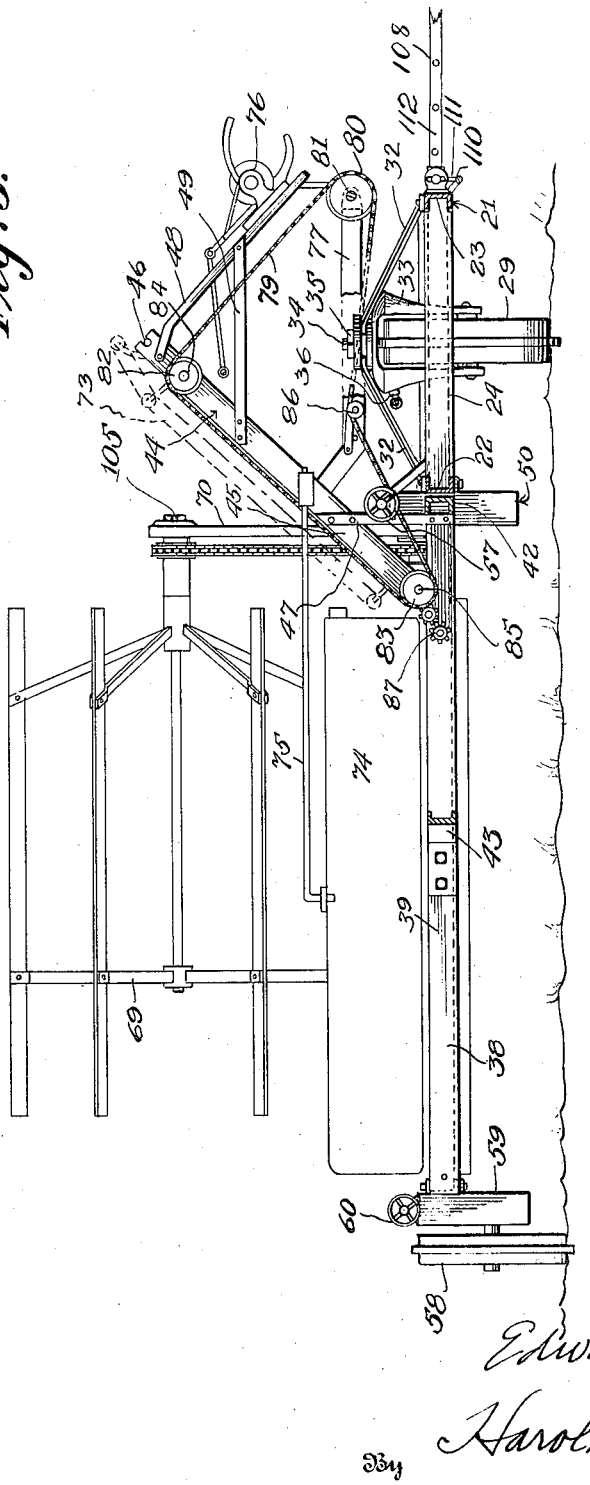

Aug. 28, 1923.
E. C. MYERS
HARVESTER
Filed July 6, 1920
1,466,098
4 Sheets-Sheet 4
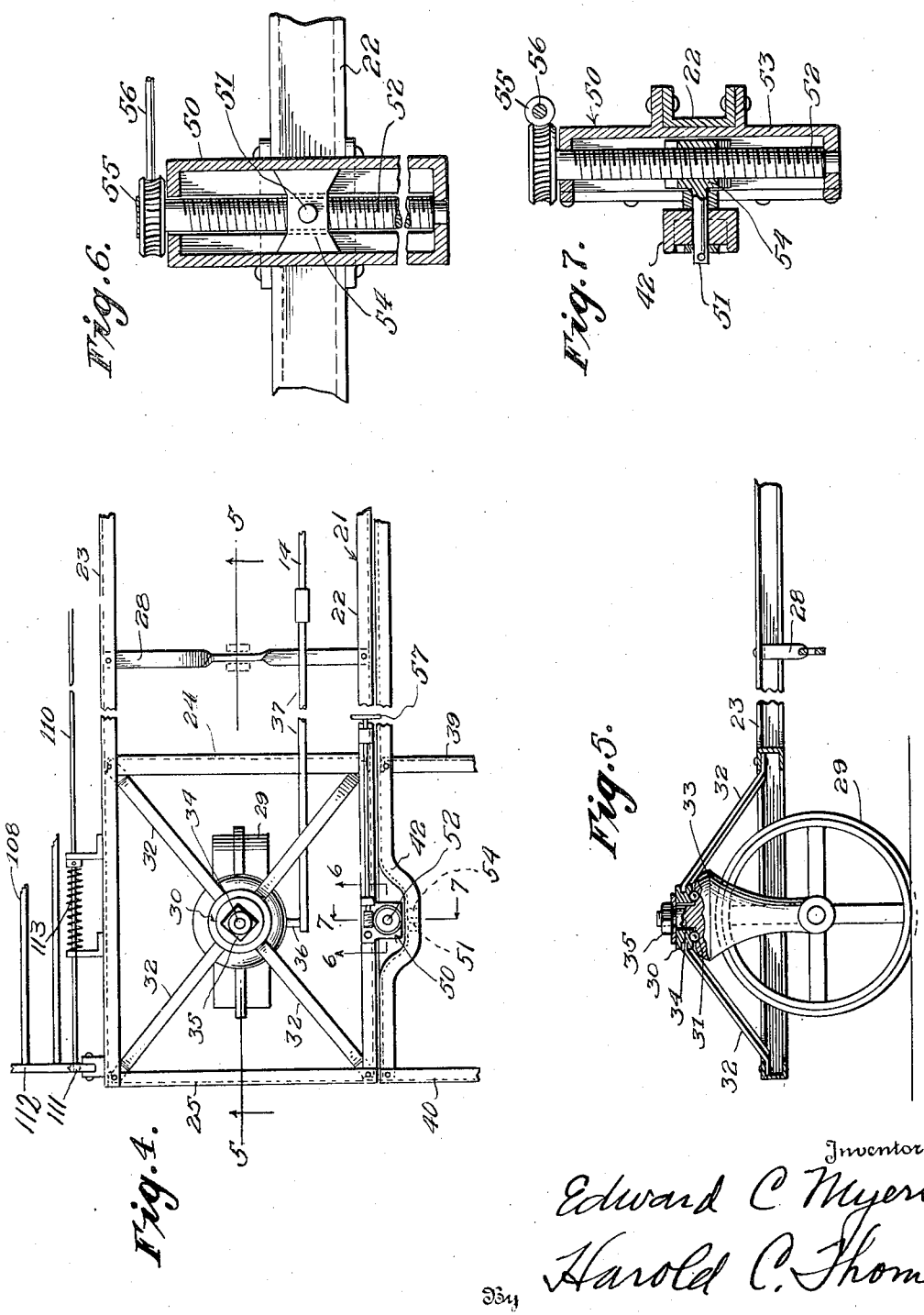

Patented Aug. 28, 1923.

1,466,098

UNITED STATES PATENT OFFICE.

EDWARD C. MYERS, OF SEATTLE, WASHINGTON.

HARVESTER.

Application filed July 6, 1920. Serial No. 394,337.

*To all whom it may concern:*

Be it known that I, EDWARD C. MYERS, a citizen of the United States, residing at Seattle, in the county of King and State of Washington, have invented certain new and useful Improvements in Harvesters, of which the following is a specification.

This invention relates to harvesters, and its primary object is to provide harvesting machinery which can be readily attached to small types of tractors in a manner to form a unitary structure without materially altering the tractor.

The invention relates more particularly to a harvester having a frame construction adapted for connection with the modern frameless type of tractors which are built to pull or push a load but not to carry it. The frame members of the harvester are extended back and firmly secured to the rear axle housing of the tractor and its draw bar, and provide for a support for the front end of the tractor from which the front axle and wheels have been removed,—thus harnessing the tractor into the harvester.

Further features of the invention reside in the provision of a tilting harvester having driving connections with the tractor engine for its source of power, and all control devices having connections extending to a position where they can be operated by the tractor driver.

These and other features of the invention will appear in detail as described in connection with the accompanying drawings, and hereinafter set forth and claimed.

Referring to the drawings forming a part of this specification, and on which similar characters of reference on the different figures thereof indicate corresponding elements or features of construction:

Figure 1 is a top plan view of a tractor and harvester embodying my invention,

Figure 2 is a side elevation and sectional view thereof taken on line 2—2 of Figure 1, Figure 3 is a sectional elevation view taken on line 3—3 of Figure 1, Figure 4 is a fragmentary plan view of the front end of the supporting frame construction and its connection with the tilting platform frame, Figure 5 is a sectional elevation view taken on line 5—5 of Figure 4, Figure 6 is a sectional view taken on line
6—6 of Figure 4,

Figure 7 is a sectional view taken on line 7—7 of Figure 4, and

Figure 8 is a sectional view taken on line 8—8 of Figure 2.

The tractor, parts of which are outlined in the drawings, represents one of the small types of tractors, and is designated generally by the reference numeral 10 in Figures 1 and 2 of the drawing. The main parts of the tractor which will hereinafter be referred to in connection with this invention, and disclosed in these figures are as follows,—the engine 11; rear axle and differential housing 12; steering column and wheel 13; steering link 14; power drive shaft 15; draw bar 16; driver's seat 17; radiator 18; fuel tank 19; and rear tractor wheels 20.

The supporting frame 21, of my improved harvesting machine is preferably, though not necessarily, constructed of channel iron comprising side members or push bars 22 and 23, and cross members 24 and 25, at the front end thereof. The rear ends of said side members pass under the rear axle housing 12 of the tractor and are fastened to it by suitable castings 26 made to fit the axle housing of the particular tractor they are to be used on. These castings are also designed for bolting a cross member 27 to the ends of the side members. The cross member 27 is also fastened to the tractor draw bar 16; this relieves the strain which would otherwise come entirely upon the axle housing and also assists in securely fastening the tractor in the frame. Another cross member 28 is connected with the side frame members 22 and 23, for supporting the front end of the tractor from which the front axle and wheels have been removed.

The front end of the supporting frame 21 is supported on the main wheel 29, which is used for steering the harvester and tractor. As best shown in Figures 4 and 5, a cast steel hub 30, having a ball race for ball thrust bearings 31, is secured in proper relation with the frame 21 by diagonal cross members 32, fastened to it and to the side frame members 22 and 23, and cross members 24 and 25 at their junction. The main wheel is journaled in a forked member 33, which has a ball race in its top for receiving the ball thrust bearings 31. A stub shaft 34 on the forked member extends up through the hub, 30, and is threaded at its upper end for receiving a nut 35 for holding the parts together. The steering arm 36 is secured to the forked member, and an extension steering link, 37, is connected with the steering link 14, enabling the tractor driver to control the main wheel for steering the harvester and tractor with the steering wheel 13.

The platform and cutting bar frame 38 comprises longitudinal and end angle iron members, 39, 40 and 41 respectively with the flat side down for receiving the platform apron and rollers, and a channel iron member 42 forming the other end of the frame, extends back along the side frame member or push bar 22 for use as a tilting lever as will hereinafter be set forth. A suitable brace 43 is bolted to the frame member 40 and tilting lever 42 to eliminate side draft.

The elevator frame 44 comprising channel steel side members 45 is fastened on the platform frame 38 and provided with an upper frame or brace member 46 and side braces 47 for holding the frames in proper relation with each other. The binder deck 48 is fastened to the upper portion of the elevator frame and is supported by brace members 49.

It will be noted that the frame construction of the platform and cutting bar frame, elevator frame, and binder deck, form an integral harvester frame structure, and they are so supported that they can be raised and lowered, or tilted in their relation with the supporting frame, 21. To accomplish these functions a jack 50, fastened to the side frame member 22, as best shown in Figures 4, 6, and 7, carries a stub axle 51, upon which the lever 42, of the platform and cutting bar frame is suitably journaled for pivotally supporting the harvester structure.

The jack 50 comprises a threaded shaft or screw 52, suitably journaled in a casing 53, bolted to the side frame member 22. Stub shaft 51, extends from a cast steel traveling block 54 positioned on the jack screw and machined to fit within the casing 53. A worm gear is keyed to the upper end of the screw 52, which extends through the top of the casing, and by means of a worm 55, on a shaft 56, suitably supported in brackets carried by the supporting frame 21, and having a handle 57, the jack can be operated to raise and lower the harvester structure.

The outer end of the platform and cutting bar frame is supported on a castor type wheel 58, and the bracket supporting this wheel is fitted with a screw jack 59, having an operating handle 60, similar to jack 50, and its controlling members.

In order to hold the harvester at any desired angle with respect to the supporting frame, a ratchet member 61, which is constructed in a manner to hold all the strain put on it and serves as a gauge for the tilt of the cutting bar, is bolted to the side frame member 22, as best shown in Figures 2 and 8. This ratchet member comprises a slotted casing for receiving the tilting lever bar 42, and is provided with a ratchet segment 62, on its outer side. The casing is also provided with a removable base 63, bolted thereto so, if desired the tilting lever may be readily released. A pawl 64, extends from a spring pressed block 65, mounted in the channel of the lever member, and cooperates with the ratchet for holding the lever in any desired position. By means of a rod 66, extending to one of the handles 67, on the end of the tilting lever, the pawl can be released for tilting the harvester by the lever as desired.

As shown in Figures 1 to 3, the usual form of cutting bar 68, is mounted on the frame member 40 of the platform and cutting bar frame, and this member also supports the reel 69 journaled in the upper end of a carrying arm 70 pivoted to it. The platform and elevator aprons 71, 72, and 73 travel on rollers journaled in the frames 38 and 45, and a shield 74, is suitably supported from the elevator frame by means of a rod, 75, extending from it as illustrated in Figures 2 and 3. The binder mechanism 76 is mounted on the binder deck, 48, and other parts of the binder, not shown, are carried on a bracket member 77, which supports the binder drive shaft journaled therein.

The main drive chain 79 passes over the sprocket 80 keyed to the shaft 81 journaled in the bracket 77 and driven from the tractor as will be set forth. The chain passes from sprocket 80 over sprockets 82 and 83 keyed to shafts 84 and 85 upon which the elevator drive rollers are mounted, thence, over chain tightener 86 and back to sprocket 80. The binder mechanism receives its power from the other end of the main power shaft 81. Behind the sprocket 83, on shaft 85, is a gear train 87, which is driven by said shaft and transmits motion to the driving roller 88, for the platform conveyor apron 71. At the other end of shaft 85, is a crank 89, which transmits motion to the knife of the cutting bar 68 by a link 90, connecting with it. A beveled gear 91, is also fastened to shaft 85, and meshes with a similar beveled gear 92, attached to a sprocket 93, and suitably journaled on the frame member 40. A chain passes over sprocket 93, and transmits motion to the sprocket 94, on the reel shaft for rotating the reel 69, in its journal.

Power for running the machinery is taken from the tractor engine instead of from the main binder wheel or "bull wheel" as formerly used for driving purposes. Referring to Figure 1, a beveled gear 95, is mounted on the tractor power drive shaft 15, and a similar beveled gear 96, to be driven by said gear 95, is mounted on a connecting shaft 97. A bracket bearing member 98, or housing pivotally supports the connecting shaft and holds the gears 95 and 96, in mesh with each other. A sliding or telescopic joint 99, is conveniently located on the connecting shaft 97, to permit longitudinal play of the members of the shaft, and a universal joint 100, connects it with the binder shaft 81. This driving connection will permit raising and lowering as well as tilting of the harvester machinery with respect to the tractor and supporting frame 21. A clutch or control lever 101, may be conveniently located adjacent the gears 95 and 96, and extends to a position where it is operable from the driver's seat 17, for controlling the transmission of power from the engine to the harvester machinery.

Control levers for operating the harvesting machinery are mounted on the tilting lever member, 42, in a position where they can be easily manipulated from the driver's seat 17. In this position on the tilting lever member their adjustment will be unaffected by the tilting, raising and lowering of the frames. As best represented in Figure 1, lever 102, pivoted to a ratchet segment 103, and carrying a pawl and operating mechanism 104, is connected by means of a rod 105, with the pivoted reel carrying arm 70, for adjusting the position of the reel 69. A lever 106, similarly mounted is shown connected by means of a rod 107, with the binder mechanism.

When the binder is used in connection with the harvester a bundle carrier 108 is mounted on the right frame member 23. A trip lever 109, for dumping the bundles from the bundle carrier is mounted on frame-member, 23, within easy reach of the driver, and by means of a rod, 110, connecting the trip lever and lever 111, the bundle carrier can be tilted downwardly around its horizontal axis, 112, when desired, and a spring 113, positioned between a collar on the rod and a guide on frame member 23, will afterwards return it to its normal horizontal position. (See Figures 1, 3, and 4.)

In Figures 1 and 3 the harvester frame structures are shown in an elevated horizontal position. When it is desired to use the harvester, the frames may be lowered to any desired position, as indicated in dotted lines in Figure 2, by turning the jack handles 57 and 60, and the driver can adjust the tilting lever 42, with respect to the ratchet member 61, for positioning the cutting bar 68, for different heights above the ground depending upon the lengths of grain to be harvested. The reel as well as the binder may also be controlled at the will of the operator by levers, 102 and 106.

With this harvester it is easy for one man to operate both the tractor and harvester machinery and he is seated behind the whole outfit where he can watch and control both with ease. It is also as easy to turn or back up with the harvester attached as it would be with the tractor alone, as they form a unit.

Having shown and described one embodiment of my invention, I do not desire to have it confined closely to the specific structure shown, it being understood that changes may be made in form, proportion, and organization of its various parts without departing from the spirit of the invention as indicated by the scope of the appended claims.

What I claim as my invention, and desire to secure by Letters Patent is:

1. A harvester attachment for tractors comprising a supporting frame disposed under part of the harvesting machinery, a wheel mounted in said frame for supporting the same, and push bars extending back from said frame and adapted to support the front end of a tractor and for attachment with the rear portion thereof.

2. A harvester attachment for tractors comprising a supporting frame upon which the harvesting machinery is adjustably carried, a wheel mounted under said frame for supporting the same, and push bars extending back from said frame for attachment with a tractor.

3. A harvester comprising a frame structure for carrying harvesting machinery, a supporting frame for carrying said frame structure, a wheel mounted under the supporting frame for supporting the same, and a pivotal supporting element adjustable in its height fastened to said supporting frame for pivotally supporting the harvesting machinery frame structure and adjusting its elevation with respect to the supporting frame.

4. A harvester attachment for tractors comprising a supporting frame, a tilting frame structure carrying harvesting machinery pivoted to said supporting frame, push bars extending from the supporting frame for attachment with a tractor, a lever member extending from said harvesting machinery frame structure adjacent to one of said push bars, and means for fastening said lever in adjusted position with relation to said supporting frame.

5. A harvester attachment for tractors comprising a supporting frame disposed under part of the harvesting machinery, a wheel mounted in said frame for supporting the same, side members of the frame extending back as push bars, a cross piece on said push bars for supporting the front end of a tractor, and means for clamping the rear ends of said push bars to the rear end of the tractor.

6. A harvester comprising a supporting frame, a tilting platform and cutting bar frame structure extending to one side of and pivotally mounted on the supporting frame, a lever for tilting said frame structure with respect to said supporting frame, means for holding the frames in adjusted position with respect to each other, a tractor, means for securing said supporting frame to said tractor, and means for driving the harvesting machinery from the tractor engine.

7. A harvester comprising a supporting frame, a tilting frame structure carrying harvesting machinery pivotally mounted on the supporting frame, a lever for tilting said frame structure with respect to said supporting frame, means for holding the frames in adjusted position with respect to each other, and levers mounted on said frame tilting lever and having connections with the harvesting machinery for controlling the same.

8. A harvester comprising a supporting frame upon which the harvesting machinery is adjustably carried, a wheel mounted under said frame for supporting the same, push bars extending back from said frame for attachment with a tractor, a lever extending from the harvester machinery for changing the adjustment thereof with respect to said supporting frame, and levers mounted on the first said lever and having connections with the harvesting machinery for controlling it, whereby their adjustment will be unaffected when the position of the first said lever is changed.

9. A harvester comprising a supporting frame, a tilting frame structure carrying harvesting machinery, a pivot upon which said tilting frame structure is mounted, a casing carried by the supporting frame, means in the casing for supporting said pivot in a manner that it can be raised and lowered, and means for holding said tilting frame structure in adjusted position with respect to said supporting frame.

10. A harvester comprising a supporting frame, a jack member mounted on said frame, a pivot carried by the jack to be raised and lowered thereby, a frame structure carrying harvesting machinery and mounted on said pivot, means for tilting the frame structure on said pivot, and means for holding it in adjusted position.

11. A harvester attachment for tractors comprising a supporting frame, a pivot carried by said frame, a tilting frame structure carrying harvesting machinery and mounted on said pivot, push bars extending from the supporting frame for attachment with a tractor, a lever member extending from said harvesting machinery frame structure adjacent to one of said push bars, means for fastening said lever in adjusted position with respect to said supporting frame, and a yieldable driving connection for said harvesting machinuery extending from it for connection with the tractor engine.

12. A harvester including a supporting frame mounted on a main or steering wheel and having push bars extending back for connection with a tractor, a platform and cutting bar frame extending to one side of said supporting frame, means for pivotally supporting said platform and cutting bar frame at various elevations with respect to said supporting frame, means for tilting said platform and cutting bar frame, and means for holding it in adjusted position with respect to the supporting frame.

13. A harvester including a supporting frame mounted on a main or steering wheel and having push bars extending back for connection with a tractor, a frame structure comprising a platform and cutting bar frame extending to one side of said supporting frame and having an elevator frame and binder deck mounted thereon extending over said supporting frame, and means for pivotally mounting said frame structure in a manner that it can be raised and lowered and tilted with respect to said supporting frame.

14. A harvester including a supporting frame mounted on a main or steering wheel and having push bars extending back for connection with a tractor, a frame structure comprising a platform and cutting bar frame extending to one side of said supporting frame and having an elevator frame and binder deck mounted thereon extending over said supporting frame, means for pivotally mounting said frame structure in a manner that it can be raised and lowered and tilted with respect to said supporting frame, harvester machinery mounted on said frame structure, means for driving the same from the tractor engine, and means for tilting the frame structure with respect to the supporting frame.

15. A harvester comprising a frame structure carrying harvesting machinery, a supporting frame therefor upon which it is pivotally mounted, push bars extending from said supporting frame for connection with a tractor, a lever extending from the harvestor frame structure along one of said push bars for tilting the frame structure with respect to the supporting frame, a ratchet mechanism on said push bar, and means on said lever cooperating with said ratchet mechanism for holding the frame structure in adjusted position.

16. A harvester comprising a frame structure carrying harvesting machinery, including a reel, cutting bar and binder mechanism, a supporting frame therefor upon which said frame structure is pivotally mounted, push bars extending from said supporting frame for connection with a tractor, a lever extending from the harvester frame structure along one of said push bars for tilting the frame structure with respect to the supporting frame, means cooperating with said lever for holding the frame structure in adjusted position, and levers mounted on the first said lever for adjusting the reel with respect to the cutting bar and for controlling the binder mechanism of the harvesting machinery.

17. A harvester including a frame structure comprising a horizontal frame upon which a cutting bar and platform rolls and apron are mounted, a reel journaled in an arm pivoted to said frame, a second frame mounted on said horizontal frame upon which elevator rolls and aprons are mounted, said second frame supporting a binder deck upon which a binder is mounted, driving connections between the binder, reel, platform and elevator rolls, means for driving the same, a supporting frame positioned under the elevator frame and binder deck of said frame structure, a pivot carried on said supporting frame in a manner that it can be raised and lowered forming a connection between said frame structure and the supporting frame and upon which the frame structure can be tilted, means for tilting the frame structure, means for holding the frame structure in adjusted position with respect to said supporting frame, and means for controlling the harvesting machinery.

18. A tractor harvester comprising a supporting frame adapted to have a tractor harnessed into it for pushing it, a harvesting machinery frame structure supported over the supporting frame, means for controlling the frame structure and harvesting machinery mounted thereon from a position adjacent to the tractor driver's seat, a bundle carrier pivoted to one side of the supporting frame, and a control member having connections therewith for operating the same and positioned within reach from the seat.

19. A supporting frame for attachment to a tractor comprising a frame having members thereof for extending along the sides of the tractor, means for supporting the front end of said frame, a cross piece extending under the front end of the tractor for supporting it and having its ends fastened to said side frame members, means for fastening said members to the rear end of the tractor and a second frame structure adjustably carried by the front end of said supporting frame and extending to one side thereof.

20. A supporting frame for attachment to a tractor comprising a frame having members thereof for extending along the sides of the tractor, a cross piece extending under the front end of the tractor for supporting it and having its ends fastened to said side frame members, a second cross piece adapted to be fastened to the tractor draw bar, and clamps adapted to be positioned over the rear axle housing and fastened to said side members passing under it and with said second cross piece.

21. A harvester attachment for a tractor including a frame structure adapted to be attached to the rear end and support the front end of the tractor and extend forwardly thereof and having a wheel for supporting and steering the harvester, and a frame structure extending to one side thereof upon which harvesting machinery is carried.

22. A harvester attachment for a tractor comprising a supporting frame upon which harvesting machinery is carried, a wheel mounted under said frame for supporting the same, and push bars extending back from said frame adapted to extend along the sides of the tractor and be connected therewith.

23. A harvester including a supporting frame mounted on a main or steering wheel and having push bars extending back for connection with a tractor, a platform and cutting bar frame extending to one side of said supporting frame, means for pivotally supporting one end of said platform and cutting bar frame from said supporting frame and at various elevations therewith, and means for supporting the other end of said platform and cutting bar frame at various elevations.

24. A supporting frame for attachment with tractors comprising a frame having members thereof for extending along the sides of the tractor, a cross piece extending under the front end of the tractor for supporting it and having its ends fastened to said side frame members, means for fastening said members to the rear axle housing of the tractor, and a second cross piece adapted to be fastened to the tractor differential housing and have its ends fastened to the ends of said side members.

25. A harvester attachment for a tractor comprising a frame structure having members thereof for extending along the sides of the tractor and fastened to the rear end of the tractor, a cross member connected with said side frame members and extending under the front end of the tractor for supporting it, mowing machinery on the frame structure and means for supporting and guiding the forward end of said frame structure secured to the front ends of said side frame members.

26. A harvester attachment for a tractor comprising a frame structure having members thereof for extending along the sides of the tractor and fastened to the rear end of the tractor, a cross member connected with said side frame members and extending under the front end of the tractor for supporting it, mowing machinery on the frame structure and means for supporting and guiding the forward end of said frame structure secured to the front ends of said side frame members, means for driving said mowing machinery, and means for elevating the cutting blades and controlling the mowing machinery.

27. The combination with a tractor whose engine casing transmission and differential housings and rear axle casings constitute its frame structure, frame members having connections with one end of said tractor so as to be supported thereby and extending along the sides of the tractor and beyond the other end thereof, connections between said side frame members for supporting the second named end of the tractor, means for supporting the ends of said side frame members extending beyond the tractor, a working implement mounted on the extending side frame members, and a driving connection between said working implement and the tractor engine.

28. A supporting frame for attachment to a tractor comprising a frame having members thereof for extending along the sides of the tractor, means for supporting the front end of said frame, a cross piece extending under the front end of the tractor for supporting it and having its ends fastened to said side frame members, means for fastening said members to the rear end of the tractor, and a second frame structure adjustably carried by the front end of said supporting frame.

In testimony whereof I affix my signature.

EDWARD C. MYERS.